United States Patent
Schoener et al.

(10) Patent No.: US 12,329,147 B2
(45) Date of Patent: Jun. 17, 2025

(54) METHOD AND APPARATUS FOR ACCLIMATING ANIMALS TO HUMANS

(71) Applicants: Greg Schoener, Kingwood, TX (US); Kolbey Schoener, Houston, TX (US)

(72) Inventors: Greg Schoener, Kingwood, TX (US); Kolbey Schoener, Houston, TX (US)

(*) Notice: Subject to any disclaimer, the term of this patent is extended or adjusted under 35 U.S.C. 154(b) by 30 days.

(21) Appl. No.: 17/890,904

(22) Filed: Aug. 18, 2022

(65) Prior Publication Data

US 2023/0059076 A1 Feb. 23, 2023

Related U.S. Application Data

(60) Provisional application No. 63/234,467, filed on Aug. 18, 2021.

(51) Int. Cl.
*A01M 31/00* (2006.01)
*A01M 31/02* (2006.01)
*H04R 1/02* (2006.01)

(52) U.S. Cl.
CPC ........ *A01M 31/004* (2013.01); *A01M 31/025* (2013.01); *H04R 1/02* (2013.01); *H04R 2201/028* (2013.01)

(58) Field of Classification Search
CPC ..... A01M 31/004; A01M 31/025; H04R 1/02; H04R 2201/028
See application file for complete search history.

(56) References Cited

U.S. PATENT DOCUMENTS

| | | | |
|---|---|---|---|
| 2009/0078216 A1* | 3/2009 | Bell | A01M 29/16 119/719 |
| 2015/0173672 A1* | 6/2015 | Goldstein | A61B 5/6898 600/301 |
| 2019/0219095 A1* | 7/2019 | Wynalda, Jr. | F16C 11/0695 |
| 2019/0238960 A1* | 8/2019 | Cheney | H04R 1/025 |
| 2021/0267168 A1* | 9/2021 | Tai | G06F 3/165 |

OTHER PUBLICATIONS

Biedenweg et al, "Sounds Scary? Lack of Habituation following the Presentation of Novel Sounds." Jan. 18, 2011, Plos One, https://di.org/10.1371/journal.pone.0014549; p. 2, paragraph 5. (Year: 2011).*

* cited by examiner

*Primary Examiner* — Nabil H Syed
*Assistant Examiner* — Cal J Eustaquio

(57) ABSTRACT

Disclosed is a method for acclimating animals in a habitat area to specific sounds caused by humans, specifically motorized vehicle sounds. Also disclosed is a device for acclimating animals in a habitat area to specific sounds caused by humans acclimating Recorded sounds are played back at specified times using the device, which is remotely positioned in the habitat area. This playback, when conducted for a sufficient period of time, acclimates the animals in that habitat to the recorded sounds.

24 Claims, 5 Drawing Sheets

METHOD AND APPARATUS FOR ACCLIMATING ANIMALS TO HUMANS

CROSS-REFERENCE TO RELATED APPLICATION

This application claims the benefit of U.S. Prov. App. No. 63/234,467 filed Aug. 18, 2021, which is incorporated by reference herein in its entirety.

BACKGROUND

The present invention relates to a method and apparatus for acclimating animals to specific sounds associated with humans, such as motorized vehicles.

Outdoor enthusiasts (hunters, photographers, nature observers, researchers, scientists, etc.) have a desire to get close to nature and wild animals for many purposes. Many use a "hunting blind," or observation post of some sort, in order to get close to wild animals and remain undetected. Typically, the observer travels from their base camp to their desired location, in order to sit and wait for their desired target to come within range. For optimum results, the observer needs to enter the animal's environment without having their presence compromised. It is commonplace for such permanent observation structures to be located on private land, either a deer lease, family land, or landowner permission, and leave their blinds in the area they will always observe from. Using motorized vehicles to reach the observation destinations is commonplace, especially on large tracts of land or in more rugged locations. Engine noise from such motorized vehicles is disturbing to the bulk of wildlife, so observers wishing to enter the area undetected is impractical, if not impossible.

Wildlife, such as whitetail deer, mule deer, and especially predatory type species are creatures of habit. They do not like anything outside of their normal daily routine to occur. This includes loud sounds they do not hear regularly. Accordingly, it is a problem for individuals to drive their motorized vehicles into an area where wildlife does not hear an engine on a regular basis. This puts the animals into a protective mindset, such that they will not continue with their daily routine but rather hide or flee until they feel safe again. Many individuals sometimes drive their motorized vehicles miles through rugged terrain to get to a desired location. Walking to these spots may not be an option, so motorized vehicles are a necessity, especially when carrying equipment.

Additionally, many people use remote sensing game cameras to observe wildlife. These are used to monitor wildlife movement patterns when the observer is not present. The photos are bulk stored on SD cards within the camera so periodic visits to the camera to retrieve the SD cards are required. A typical problem is that the number and quality of animals they see on their camera is not consistent with what they see while hunting that same location. The cameras often show far more and higher quality animals when the observer is not there due to the lack of noise/disturbance. In a typical hunting scenario, hunters usually arrive to the property on weekends or holidays, stay a few days and then are gone again. This practice of "on again, off again" is very disruptive to wildlife's normal daily routine and causes them to act erratically and unpredictably. This unpredictability is problematic for people with limited time afield, whether hunting, observing nature, or conducting research.

One example of becoming a part of the animals' daily habits are hunting blinds. If a hunter were to put out the hunting blind and expect to use it immediately, the hunt would most likely be unsuccessful. Hunters leave their blinds out all season, if not all year, because it allows the animals to become acquainted to seeing that object there. Some hunters use hunting blinds that go high in trees and use lots of camo, but other hunters often use large 10'×10' blinds on 20' tower stands. There is no way to hide something that big and tall, but it does not affect the hunter because once that stand has been out for an extended period of time, the deer become acclimated to it in their area.

Properties that extensively use equipment realize a similar effect. The animals become acquainted with the equipment and begin to become comfortable being around it. The equipment is running 5-7 days a week, so eventually the animals realize the machine is not a threat to them, and they begin to become comfortable being around it. Similarly, in cities with high deer populations, people will often see deer in the medians of major roadways, feeding on the side of the road, or even eating the flowers in their yard. This is because the deer are acclimated to cars, houses, and people, and are no longer scared of these things.

What is needed is method for acclimating animals to these disruptive sounds created by outdoor enthusiasts.

SUMMARY OF THE INVENTION

The present invention relates to a method of acclimating animals to humans in a habitat area. The method consists of providing an acclimating device capable of automated remote playback of one or more recorded sounds, recording one or more sounds associated with the humans, positioning the acclimating device in the habitat area, and playing the one or more recorded sounds in the habitat area at or more specified times per day for a specified number of days, wherein the playing step acclimates animals living within the habitat area to the one or more recorded sounds.

The present invention also relates to an acclimating device for acclimating animals to humans in a habitat area. The acclimating device consists of a portable main housing positioned in the habitat area, a means for storing one or more recorded sounds associated with the humans, a means for playing back the one or more recorded sounds at specified times on specified days, a means for selecting the specified times on specified days, a means for attaching the portable housing to a structure located in the habitat area, a battery (preferably rechargeable), and a solar panel for charging the battery.

BRIEF DESCRIPTION OF THE FIGURES

The features and advantages of the present invention will be more clearly understood from the following description taken in conjunction with the accompanying drawings as described below.

DETAILED DESCRIPTION OF THE INVENTION

Figure 1:
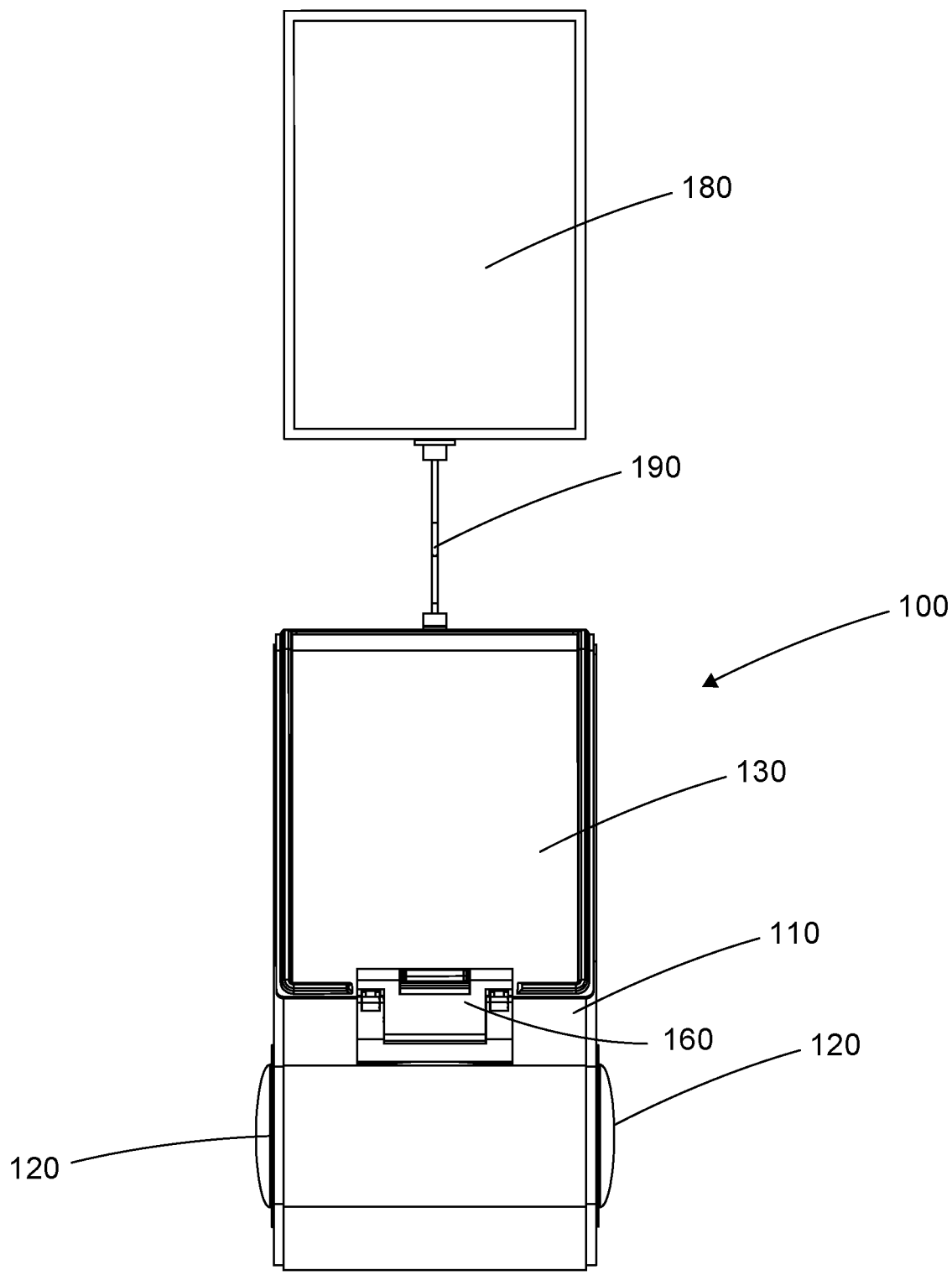
FIG. 1 illustrates a front view of a preferred acclimating device of the present invention.
Figure 2:
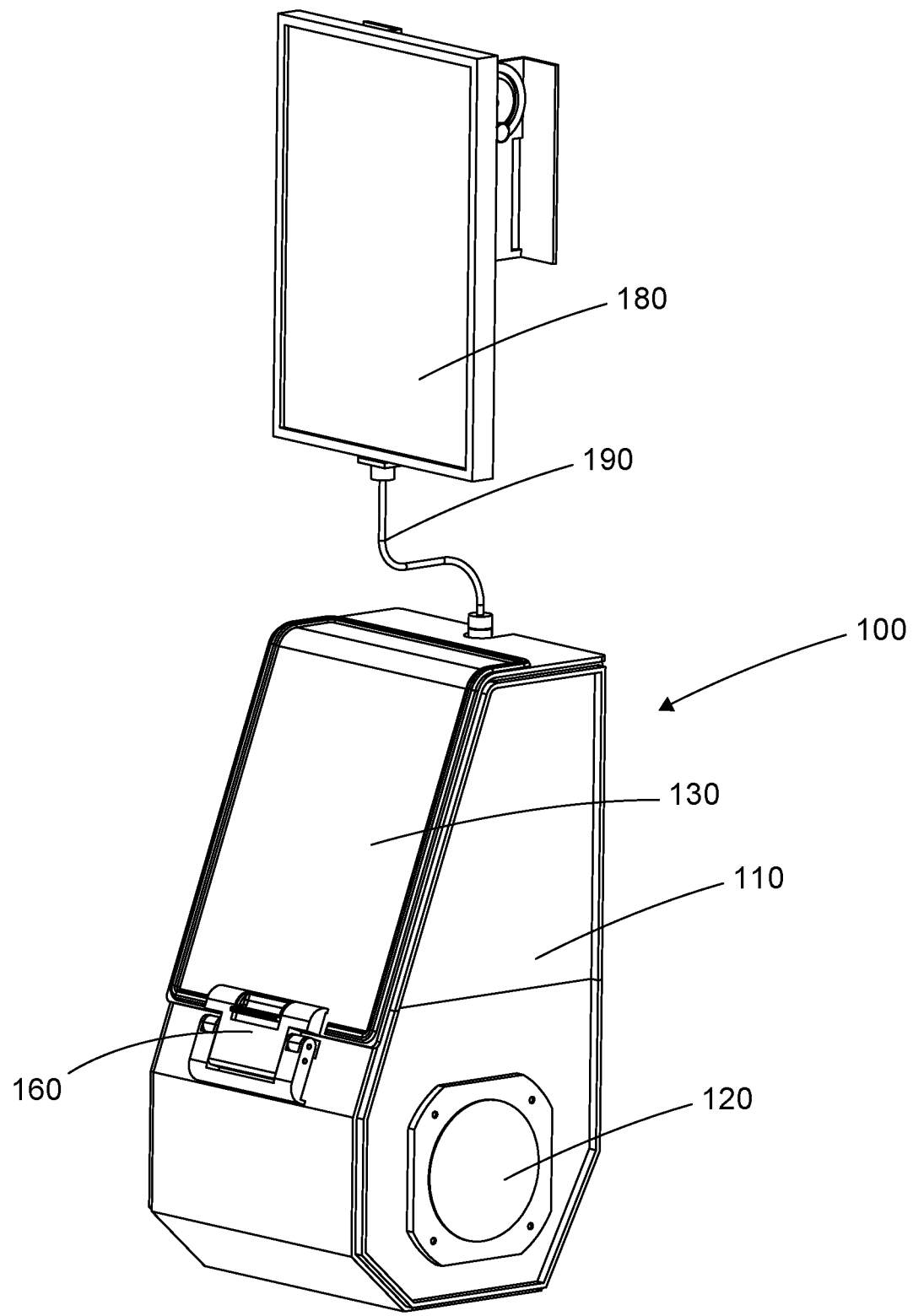
FIG. 2 illustrates a front isometric view of the acclimating device of FIG. 1.
Figure 3:
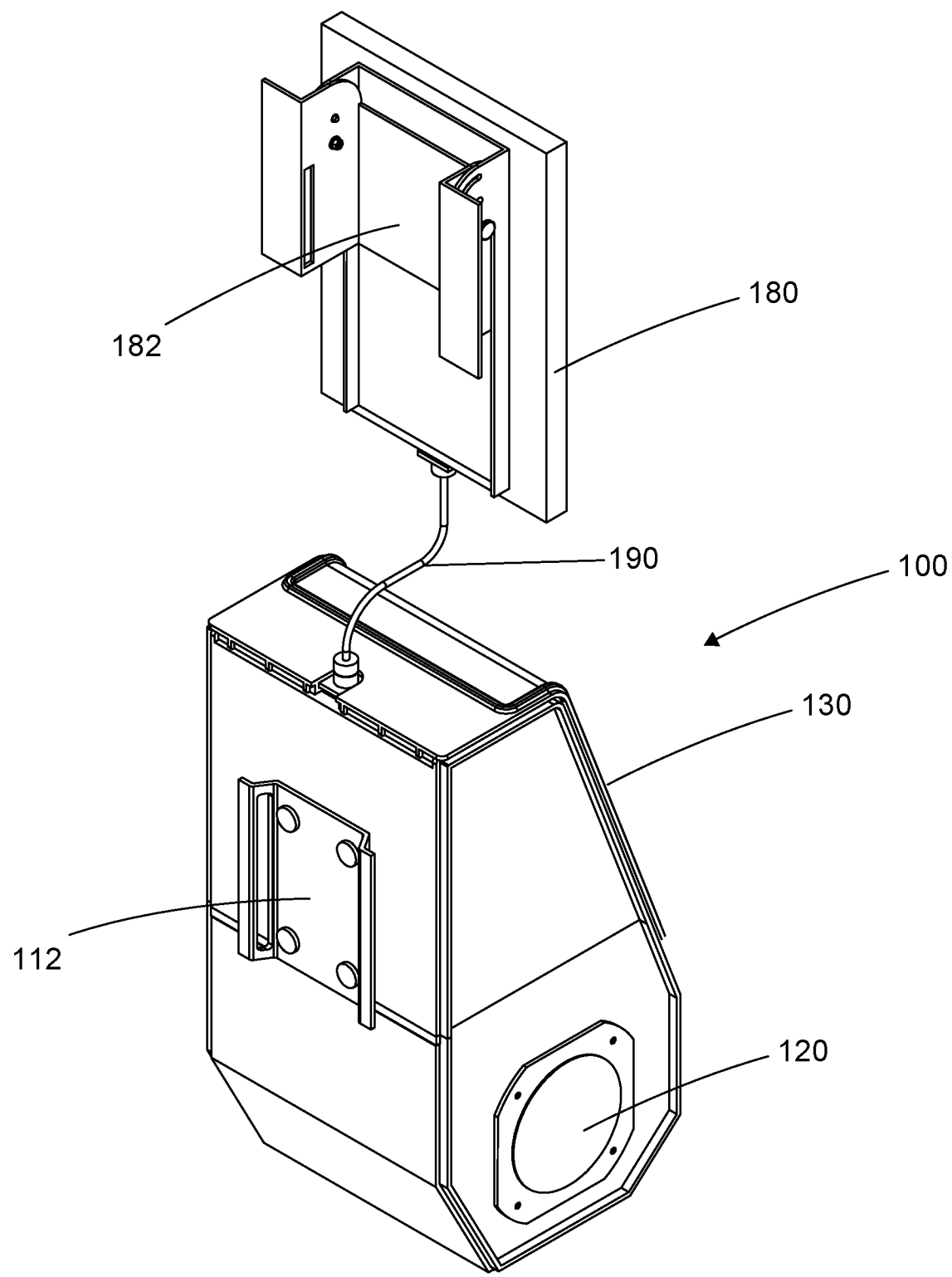
FIG. 3 illustrates a rear isometric view of the acclimating device of FIG. 1.

Embodiments of the present disclosure may beneficially increase the chance that animals, whether they be wild, game, ranch, livestock, or domesticated, will acclimate to specific sounds caused by humans, such as hunters, photographers, ranchers, or wildlife enthusiasts, collectively referred to as "humans" hereinafter for simplicity. Likewise, reference to a "habitat area" means any location where a human may interact with or pursue such animals.

In a first embodiment of the present invention, a method is provided for acclimating animals to the specific sounds of humans, such as the sounds of one or more specific motorized vehicles. For example, a hunter may intend to use a specific motorized vehicle, such as an all-terrain vehicle (ATV), to transport himself/herself to the hunting area. It is envisioned that the present invention can be utilized to acclimate animals to any sound, including any type of vehicle. In one illustrative embodiment of the present invention, the human records one or more sounds from the specified motorized vehicle, and utilizes an acclimating device capable of automated remote playback of the one or more sounds at one or more specified times in the habitat area. This playback, when conducted for a sufficient period of time, acclimates the animals in that habitat to the recorded sounds.

In the hunting exemplar described above, the wild game in the hunting area becomes accustomed to the sounds of the ATV engine running, accelerating, etc., thereby imitating the hunter driving to and from the hunting area. As such, instead of only hearing the engine only a few weekends out of the year during hunting season, the animals hear the one or more engine sounds multiple times every day. The method according to the present invention thereby creates a new normal for the animals, specifically creating a sense that the hunters are resident in that hunting area.

Persons having ordinary skill in the art will also appreciate that, in most activities such as hunting, photography, ranching or research, humans tend to be more active in the field twice a day—in the morning and in the evening. In one illustrative embodiment, a human may drive his or her motorized vehicle four times a day in the habitat area, on the way to and from the habitat area in the morning, and to and from the habitat area in the evening. In a preferred aspect of the present invention, the method of the present invention includes utilizing an acclimating device having a microcontroller programmed to playback the recorded sounds to mimic these four times that a motorized vehicle is typically used. Over time, a new habit for the animals will be formed.

In a non-limiting example of the present invention, an acclimating device is mounted to a hunting blind, with a solar panel mounted in a spot to receive the most sunlight possible. The user would then record the sound of their ATV driving to thee hunting blind (Sound 1) and then leaving thee hunting blind (Sound 2). Each sound for this application would be approximately 30-60 seconds due to the vehicle starting or ending far away depending on speed of travel. On the acclimating device, the user set Sound 1 to play at the times he would typically drive to the hunting blind, around 6:30 am and 3:30 pm. He would set Sound 2 to play at the times he would typically leave the hunting blind, around 9 am and 6 pm. The acclimating device would then automatically play these sounds at their prescribed times every day, so that wildlife in the area was acclimated to the ATV engine noises. In this example, the hunter noticed wildlife acclimation after approximately 2 weeks of use. A person having ordinary skill in the art will appreciate that acclimation results may vary as individual animals may react slightly differently. Furthermore, animals near highways may respond to the sound quicker since they are already accustomed to motorized vehicle sounds, as opposed to who are far from roads and may only hear engines/humans a few times a year.

In a second embodiment of the present invention, an acclimating device is provided for executing the aforementioned method. With reference to FIGS. 1-4, acclimating device 100 includes a main housing 110, housing bracket 112, speakers 120, housing lid 130, battery compartment lid 140, battery 150, housing lid latch 160, control module 170, solar panel 180, solar panel bracket 182, and solar panel conduit 190.

At least main housing 110, housing lid latch 160, and battery compartment lid 140 are preferably constructed of injected molded plastic that is weather and UV light resistant, although any material known by a person skilled in the art could be utilized including, without limitation: stainless steel (SS), acrylic, polyvinyl chloride (PVC), polycarbonate (PC), polyetherimide (PEI), polyamide (nylon), polyoxymethylene (POM), polystyrene (PS), acrylonitrile butadiene styrene (ABS), polypropylene (PP), high density polyethylene (HDPE), and copolymers of PP or HDPE. Main housing 110 is preferably 12-18 inches tall and 6-12 inches wide. Although any size is generally considered to be within the scope of the present invention, the preferred size is as small is practical considering the components within main housing 110, such as control module 170 and its subassemblies (microcontroller, amplifier, charger module, user interface, and audio storage), battery 150, and speakers 120. Main housing 110 can be of any general shape, and may include ornamental features, whether integrated therein or attached thereto.

Housing bracket 112 can be of any design suitable for connecting main housing 110 to a support object such as a deer blind, a building, a tree, or a post. The connection can be made by any means known to a person having skill in the art, such as by bolting bracket 112 to the support object, or by securing bracket 112 to the support object using a strap.

Speakers 120 can be any weatherproofed speaker that is generally known to a person have ordinary skill in the art. The preferred number of speakers is two, although it is envisioned that one or more speakers can be in used in furtherance of the inventive method described above, the key being that the volume and sound emitted by the speakers is equivalent to and mimics the specific sounds to which the wild animals are to be acclimated to, for example, an ATV starting sound, an ATV driving sound, a truck starting sound, a truck driving sound, etc.

Housing lid 130 is designed to interact with housing lid latch 160 to maintain housing lid in a locked and sealed engagement with housing lid 130. FIGS. 1-4 depict a preferred embodiment of the engagement between main housing 110, housing lid 130, and housing lid latch 160.

Battery compartment lid 140, which is located inside main housing 110 and housing lid 130 is designed to provide a generally sealed compartment for battery 150. Battery 150 can be any type of rechargeable battery suited for the present invention, such as a 12V/10Ah Lithium LiFePO4 Deep Cycle Rechargeable Battery, a 12V/7Ah Rechargeable Sealed Lead Acid Battery, or equivalent. Battery 150 is preferably charged using solar panel 180 via solar panel conduit 190 and a charge module (not shown, subcomponent of control module 170) that is designed to regulate charging of battery 150 and provide overvoltage protection. Solar charging components are well known to persons having ordinary skill in the art, and all methods and substitutes are considered within the scope of the present invention.

Solar panel 180 can be of any size and specification, although it is preferred that the solar panel 180 provides 1-10 W of power, although more or less power is acceptable to maintain charge on battery 130. Solar panel 180 is preferably 8-12 inches tall and 6-10 inches wide, although any size is generally considered to be within the scope of the present invention provided it generates enough power to charge battery 150.

Solar panel bracket 182 can be of any design suitable for connecting solar panel 180 to a support object such as a deer blind, a building, a tree, or a post. The connection can be made by any means known to a person having skill in the art, such as by bolting bracket 182 to the support object, or by securing bracket 182 to the support object using a strap. Solar panel bracket 182 (and solar panel 180) can be located any distance from main housing 110, by adjusting the length of solar panel conduit 190, but it is preferred that solar panel bracket 182 is located with continuous access to the sun during the day. It is also preferred that solar panel bracket 182 is adjustable to maximize the angle, and therefore exposure, of solar panel 180 with respect to the sun.

Control module 170 consists of one or more integrated electrical components and/or subassemblies. Microcontroller 200 is preferably a programmable VLSI integrated circuit chip capable of receiving input signals from an input device, displaying to a display unit, storing audio files within a memory device (such as an SD card, micro SD card, or flash memory), automatically accessing stored audio files and associated signals based on a programmable and user selected clock setting, and sending audio signals from audio storage to an amplifier (and ultimately to speakers). The memory device maintains audio recordings or audio files of the acclimating sound, as discussed above, such as, for example, an ATV starting sound, an ATV driving sound, a truck starting sound, a truck driving sound, etc.

Figure 4:
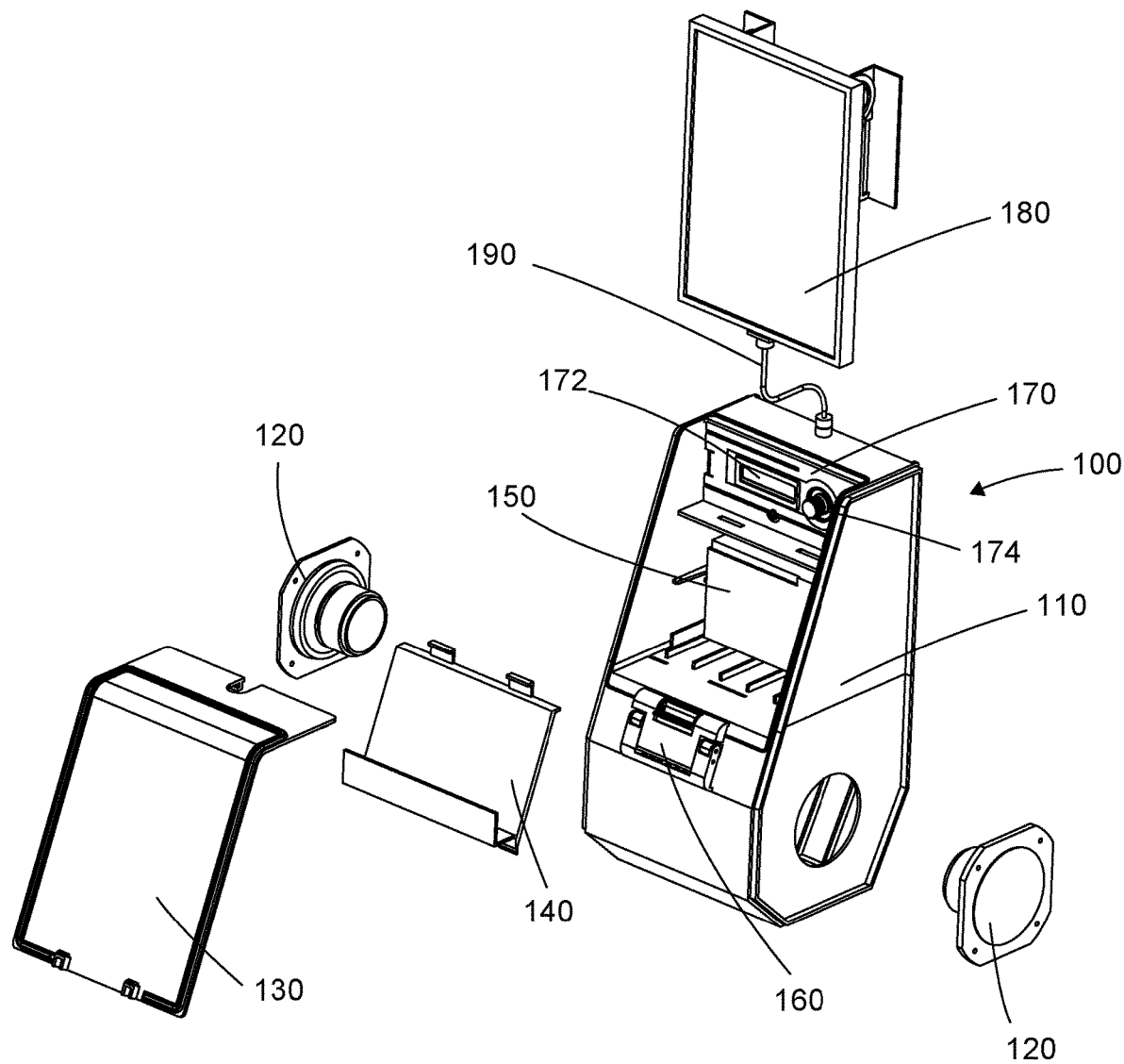
FIG. 4 illustrates an exploded front isometric view of the acclimating device of FIG. 1, with speakers, housing lid, and battery lid removed.
Figure 5:
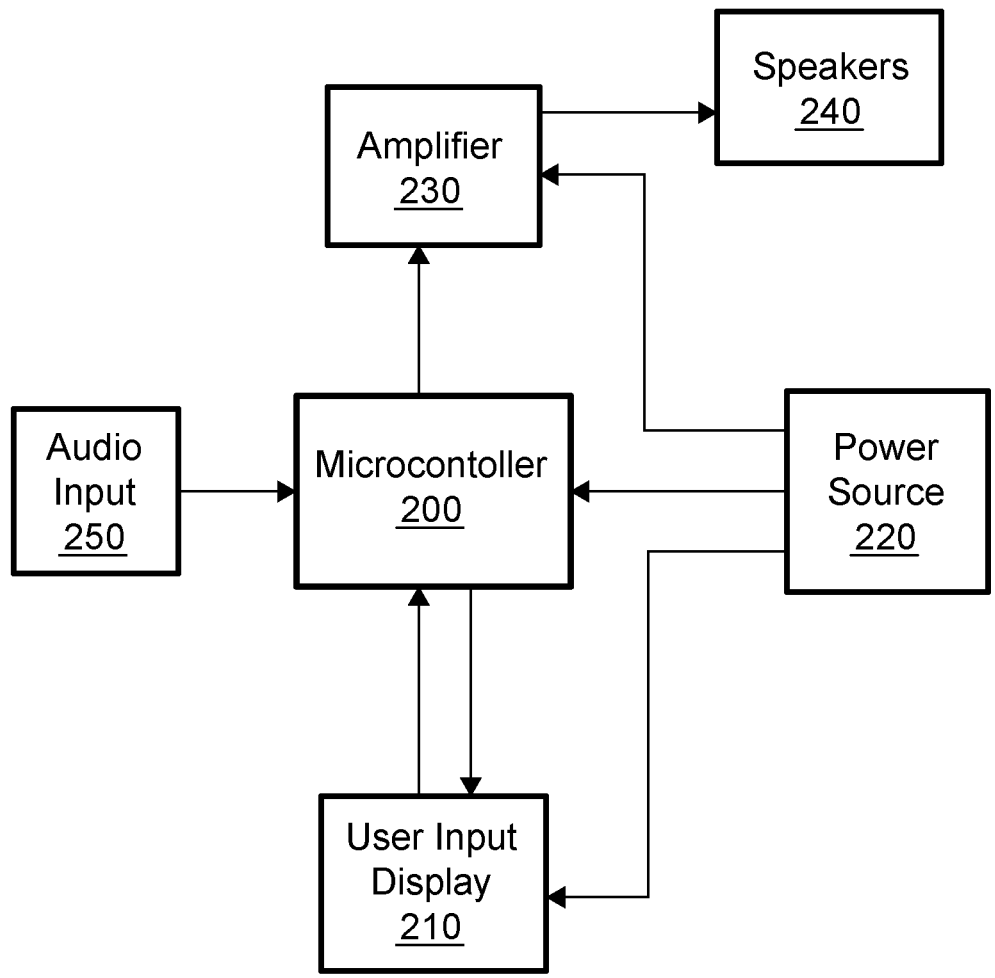
FIG. 5 is a block flow diagram depicting subassemblies of a control module in accordance with certain teachings of the present invention.

With reference to FIG. 5, microcontroller 200 receives input from user input/display 210. This may take the form of knob 174 (as shown in FIG. 4), or through any other input means known in the art, such as a touch screen, keypad/keyboard, remote control, or Bluetooth control. Microcontroller 200 provides output to input/display 210, which may consist of the display of a menu or the program selection (i.e., the times and or time intervals for playing audio signals). Audio input 250 is preferably a microphone that removably plugs into control module 120 using a 2.5 mm or a 3.5 mm mic jack, for example. For this embodiment, input/display 210 may also be configured to enable the user to store a live recording in the memory device described above. Alternatively, it is envisioned that an SD or micro SD card can be removably added to the memory device with pre-recorded audio files. Microcontroller 100 is programmed to send audio signals to amplifier 230, and ultimately to speakers 240 according to the user selected program. Power source 220, which in a preferred embodiment is rechargeable battery 150 described above, provides power to microcontroller 200, user input/display 210, and amplifier 230.

In another embodiment of the present invention, a method of acclimating animals to humans in a habitat area is provided. The method consists of providing an acclimating device capable of automated remote playback of one or more recorded sounds, recording one or more sounds associated with the humans, positioning the acclimating device in the habitat area, and playing the one or more recorded sounds in the habitat area at or more specified times per day for a specified number of days, wherein the playing step acclimates animals living within the habitat area to the one or more recorded sounds. In one aspect of this embodiment, the one or more sounds associated with the humans comprise motorized vehicle sounds. The humans may be selected from hunters, photographers, ranchers, or wildlife enthusiasts, and the habitat area is generally selected from a hunting lease, ranch, park, or wildlife preserve. The acclimating device is attachable to any structure within the habitat area, such as a deer blind, post, house, or tree. The animals to be acclimated include all wildlife in the habitat area, such as deer on a hunting lease or horses on a ranch. In one aspect of this embodiment, the playing step consists of playing recorded motorized vehicle sounds in the habitat area at least twice per day, alternatively at least four times per day, and alternatively two times in the morning and two times in the evening.

In yet another embodiment of the present invention, s device for acclimating animals to humans in a habitat area is provided. The acclimating device consists of a portable main housing positioned in the habitat area, a means for storing one or more recorded sounds associated with the humans, a means for playing back the one or more recorded sounds at specified times on specified days, a means for recording sounds associated with the humans, a means for selecting the specified times on specified days, a means for attaching the portable housing to a structure located in the habitat area, a battery (preferably rechargeable), and a solar panel for charging the battery. The playback means is controlled by a control module comprising a microcontroller. The storage means comprises a SD card or a micro SD card. The recorded sounds are one or more sounds associated with a motorized vehicle. The playback means comprises an amplifier and one or more speakers. The attaching means comprises a bracket that can be bolted or strapped to the structure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

What is claimed is:

1. A method of acclimating wildlife animals to humans in the animals' habitat area, comprising:
    providing an acclimating device capable of automated remote playback of one or more recorded sounds;
    recording one or more sounds associated with the humans;
    positioning the acclimating device in the animals' habitat area; and
    playing the one or more recorded sounds in the animals' habitat area at one or more specified times per day for a specified number of days;
    wherein the playing step acclimates the animals living within the animals' habitat area to the one or more recorded sounds.

2. The method of claim 1, wherein the one or more sounds associated with the humans comprise motorized vehicle sounds.

3. The method of claim 1, wherein the humans are selected from hunters, photographers, ranchers, or wildlife enthusiasts.

4. The method of claim 1, wherein the humans are hunters and the habitat area is a hunting lease.

5. The method of claim 4, wherein the acclimating device is attached to a deer blind.

6. The method of claim 4, wherein the acclimating device is attached to a post or tree near a deer blind.

7. The method of claim 1, wherein the humans are ranchers and the animals are horses.

8. The method of claim 1, wherein the playing step comprises playing recorded motorized vehicle sounds in the habitat area at least twice per day.

9. The method of claim 1, wherein the playing step comprises playing recorded motorized vehicle sounds in the habitat area at least four times per day.

10. The method of claim 1, wherein the playing step comprises playing recorded motorized vehicle sounds in the habitat area two times in the morning and two times in the evening.

11. A device for acclimating wildlife animals to humans in the animals' habitat area, comprising:
   a portable housing positioned in the habitat area;
   means for storing one or more recorded sounds associated with the humans; and
   means for playing back the one or more recorded sounds at specified times on specified days in the animals' habitat area,
   wherein the means for playing back acclimates the animals living within the animals' habitat area to the one or more recorded sounds.

12. The device of claim 11, wherein the playback means is controlled by a control module comprising a microcontroller.

13. The device of claim 1, wherein the storage means comprises a SD card.

14. The device of claim 11, further comprising means for recording sounds associated with the humans.

15. The device of claim 11, wherein the recorded sounds are one or more sounds associated with a motorized vehicle.

16. The device of claim 11, wherein the playback means comprises an amplifier and one or more speakers.

17. The device of claim 11, further comprising means for selecting the specified times on specified days.

18. The device of claim 11, further comprising means for attaching the portable housing to a structure located in the habitat area.

19. The device of claim 18, wherein the attaching means comprises a bracket that can be bolted to the structure.

20. The device of claim 18, wherein the attaching means comprises a bracket that can be strapped to the structure.

21. The device of claim 18, wherein the structure is selected from a deer blind, a post, a building, or a tree.

22. The device of claim 11, further comprising a battery.

23. The device of claim 22, wherein the battery is a rechargeable battery.

24. The device of claim 22, further comprising a solar panel for charging the battery.

* * * * *